United States Patent [19]
Jain et al.

[11] Patent Number: 5,156,657
[45] Date of Patent: Oct. 20, 1992

[54] PROCESS FOR PRE-PURIFICATION OF AIR FOR SEPARATION

[75] Inventors: Ravi Jain, Piscataway; Alberto I. LaCava, South Plainfield, both of N.J.

[73] Assignee: The BOC Group, Inc., Murray Hill, N.J.

[21] Appl. No.: 501,065

[22] Filed: Mar. 29, 1990

[51] Int. Cl.$^5$ .............................................. B01D 53/04
[52] U.S. Cl. .......................................... 55/26; 55/33; 55/35; 62/18
[58] Field of Search ........................ 55/33, 31, 26, 35; 62/18, 19, 23

[56] References Cited

U.S. PATENT DOCUMENTS

| | | | |
|---|---|---|---|
| 4,636,225 | 1/1987 | Klein et al. | 55/31 |
| 4,711,645 | 12/1987 | Kumar | 55/26 |
| 4,756,723 | 7/1988 | Sircar | 55/33 X |

FOREIGN PATENT DOCUMENTS

| | | |
|---|---|---|
| 0232840 | 8/1987 | European Pat. Off. . |
| 3045451 | 7/1981 | Fed. Rep. of Germany . |
| 3702190 | 8/1988 | Fed. Rep. of Germany . |
| 95079 | 7/1980 | Japan . |
| 57-99316 | 6/1982 | Japan . |
| 4414 | 1/1984 | Japan . |

OTHER PUBLICATIONS

Skarstrom, C. W.; *Recent Developments In Separation Science*, vol. 2, pp. 95-106, CRC Press, Cleveland, 1972.
K. B. Wilson, A. R. Smith and A. Theobald, "Air Purification for Cryogenic Air Separation Units", IOMA Broadcaster, Jan.-Feb., 1984.
M. Tomomura and S. Nogita, "Application of PSA to the Removal of Trace Components", Kagaku Kogaku Ronbunshu, vol. 13(5), pp. 548-553, 1987.

*Primary Examiner*—Richard L. Chiesa
*Attorney, Agent, or Firm*—Coleman R. Reap; Larry R. Cassett

[57] ABSTRACT

There is disclosed an improved PSA process for the pre-purification of air to remove water vapor and carbon dioxide prior to introduction into an air separation unit. The subject process includes a step of efficiently regenerating the adsorptive beds utilized to remove the impurities wherein they are first vented to the atmosphere, then evacuated with atmospheric venting and finally purged under evacuation. Preferably, a pair of adsorptive beds operating out of phase undergo top and bottom pressure equalization prior to backfilling of the bed completing regeneration.

8 Claims, 2 Drawing Sheets

PROCESS FOR PRE-PURIFICATION OF AIR FOR SEPARATION

This invention relates to the removal of unwanted gaseous impurities from air prior to introduction into a conventional separation unit.

BACKGROUND OF THE INVENTION

Conventional air separation units (ASUs) for the production of nitrogen and oxygen by the cryogenic separation of air are basically comprised of a two-stage distillation column which operates at very low temperatures. Due to the extremely low temperatures, it is essential that water vapor and carbon dioxide be removed from the compressed air feed to an ASU. If this is not done, the low temperature sections of the ASU will freeze up making it necessary to halt production and warm the clogged sections to revaporize and remove the offending solid mass of frozen gases. This can be very costly. It is generally recognized that, in order to prevent freeze up of an ASU, the content of water vapor and carbon dioxide in the compressed air feed stream must be less than 0.1 ppm and 1.0 ppm, respectively.

A process and apparatus for the pre-purification of air must have the capacity to constantly meet, and hopefully exceed, the above levels of contamination and must do so in an efficient manner. This is particularly significant since the cost of the pre-purification is added directly to the cost of the product gases of the ASU.

Current commercial methods for the pre-purification of air include reversing heat exchangers, temperature swing adsorption and pressure swing adsorption. The first two of these approaches are described by Wilson et al in *IOMA BROADCASTER*, Jan.-Feb., 1984, pp 15-20.

Reversing heat exchangers remove water vapor and carbon dioxide by alternately freezing and evaporating them in their passages. Such systems require a large amount, typically 50% or more, of product gas for the cleaning, i.e. regenerating, of their passages. Therefore, product yield is limited to about 50% of feed. As a result of this significant disadvantage, combined with characteristic mechanical and noise problems, the use of reversing heat exchangers as a means of pre-purification has steadily declined over recent years.

In temperature swing adsorption (TSA) pre-purification, the impurities are removed at low temperature, typically at about 5° C., and regeneration is carried out at elevated temperatures, e.g. from about 150°-250° C. The amount of product gas required for regeneration is typically only about 12%-15%, a considerable improvement over reversing heat exchangers. However, TSA processes require both refrigeration units to chill the feed gas and heating units to heat the regeneration gas. They are, therefore, disadvantageous both in terms of capital costs and energy consumption.

Pressure swing adsorption (PSA) processes are an attractive alternative to TSA, since both adsorption and regeneration are carried out at ambient temperature. PSA processes, in general, do require substantially more regeneration gas than TSA. This can be disadvantageous when high recovery of cryogenically separated products is required. When a PSA air pre-purification unit is coupled to a cryogenic ASU plant, a waste stream from the cryogenic section which is substantially free of water vapor and carbon dioxide is used as the regeneration gas.

Such a PSA pre-purification process is described in German patent publication DE 3,045,451 (1981). This process operates at 5° to 10° C., 883 KPa (9Kg/cm$^2$) adsorption pressure and 98 KPa (1 atm) regeneration pressure. Feed air is passed under pressure through a layer of 13X zeolite particles to remove the bulk of water vapor and carbon dioxide and then through a layer of activated alumina particles to remove the remaining low concentrations of carbon dioxide and water vapor. Arrangement of the adsorbent layers in this manner is claimed to reduce the temperature effects, i.e. temperature drop during desorption, in the PSA beds. A process similar to that of this German patent is discussed by Tomomura et al. in *KAGAKU KOGAKU RONBUNSHU*. 13(5). (1987), pp 548-553. This latter process operates at 28°-35° C., 0.65 MPa adsorption pressure and 0.11 MPa regeneration pressure. The process has a sieve specific product of 7.1 Sm$^3$/min/m$^3$ and a vent gas loss of 6.3%. The activated alumina occupies about 40% of the bed. The relative adsorbent particle sizes used are: 13X zeolite 2.4-4.8 mm., and activated alumina 2-4mm.

Japanese Kokai patent publication Sho 59-4414 (1984) describes a PSA pre-purification process in which separate beds and adsorbents are used for water vapor and carbon dioxide removal. The water vapor removal tower containing activated alumina or silica gel is regenerated by low pressure purge while the carbon dioxide removal tower containing 13X zeolite is regenerated by evacuation only without a purge. The use of a vacuum pump can be justified in some processes having a high product recovery. Regeneration gas requirements for this process (25%) are high in comparison to those of a conventional TSA pre-purification unit (PPU).

Japanese patent publication Sho 57-99316 (1982) describes a process wherein feed air, vent gas and purge gas are passed through a heat exchanger to thereby cause adsorption and desorption to take place at nearly the same temperature. The advantage of this process is stated to be a reduction in the required quantity of regeneration gas.

In the process described in Japanese patent publication Sho 55-95079 (1980), air is treated by PSA in two stages to remove water vapor and carbon dioxide wherein dry air product from the PSA unit is used to purge the first stage and an impure nitrogen stream from the ASU is used to purge the second stage. This process is stated to be advantageous in terms of the overall nitrogen recovery.

European patent publication no. 232,840 (1987) describes a PSA process utilizing activated alumina to remove water vapor and a zeolite to remove carbon dioxide. It is stated that the use of activated alumina allows removal of water vapor at a lower temperature and, therefore. adsorption of carbon dioxide takes place at a lower temperature. Both adsorption and desorption take place close to ambient temperature.

In the PSA cycle described in laid-open German Offen. DE 3,702,190 A1 (1988), at least 80% of the heat of adsorption is retained in the bed and is available for regeneration. The principle of retaining heat of adsorption in PSA beds is well established in the art.

It will be appreciated that, although many pre-purification methodologies based on PSA have been proposed in the literature, few are actually being used commercially due to high capital costs associated therewith.

In general, known PSA pre-purification processes require a minimum of 25%, typically 40-50%, of the product as purge gas. As a result of having low sieve specific product, such processes have high capital cost. Reduction in the air pre-purification system capital cost is particularly important when a large plant is contemplated because scale-up for a prepurification system cost is almost linear with plant size, whereas the rest of the plant scales up by a 0.6 power law factor. Therefore, it will be readily appreciated that, for large plants, improvements in prepurification system operation can result in considerable cost savings.

In accordance with the present invention, a means of efficiently removing water vapor and carbon dioxide has been found which is advantageous over the prior art in terms of capital cost and purge gas requirement.

SUMMARY OF THE INVENTION

Hater vapor and carbon dioxide are removed from air prior to introduction into an ASU by a PSA process wherein they are adsorbed from air in an adsorptive bed, which is regenerated in three stages consisting of venting to the atmosphere, venting under evacuation and purging under evacuation. The high efficiency of adsorption due to the use of small adsorbent particles and high efficiency of regeneration resulting from the use of vacuum purge permits the use of a smaller bed volume for the adsorptive beds and reduces the purge gas requirement, thereby improving the economic attractiveness of the process as a whole.

BRIEF DESCRIPTION OF THE DRAWING

The invention will be more clearly understood by reference to the drawing in which.

DETAILED DESCRIPTION OF THE PREFERRED EMBODIMENTS

The present invention relates to an improvement in the pre-purification of air for cryogenic separation utilizing a pressure swing adsorption (PSA) cycle wherein the adsorptive bed is regenerated in three stages comprising venting to the atmosphere, venting under evacuation and purging under continued evacuation. The efficiency of the regeneration is particularly advantageous in that it affords savings in capital expenditures, since a smaller bed volume is required, as well as cost of operation, i.e. power consumed per unit of product gas produced.

Figure 1:
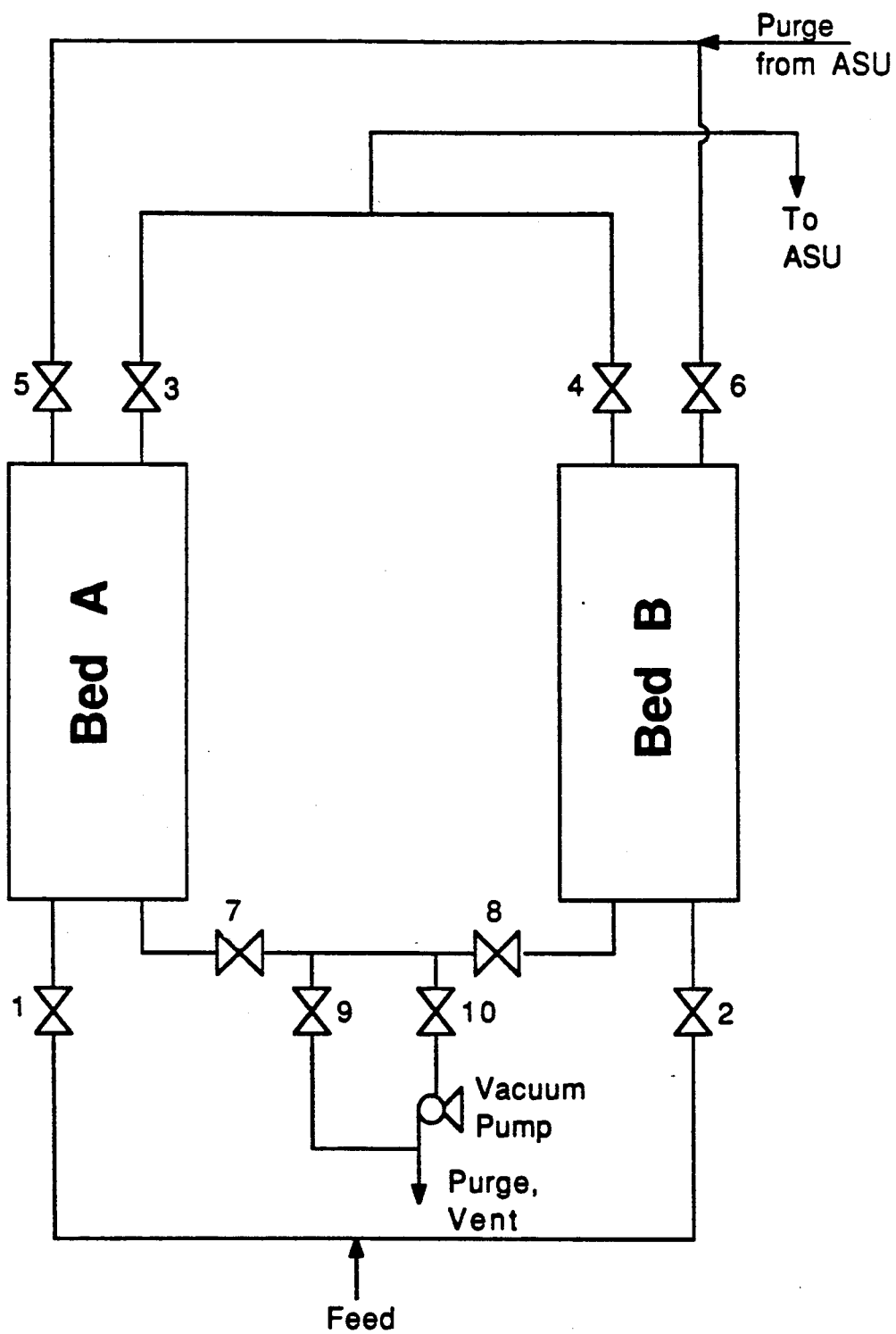
FIG. 1 is a schematic flow diagram of a pressure swing adsorption (PSA) pre-purification system according to the invention.

The improved PSA process for pre-purification of air in accordance with the present invention is shown schematically in FIG. 1. In FIG. 1, the valves controlling the flow of feed, i.e. air into the system, product withdrawal and regeneration of adsorptive beds A and B are numbered from 1 to 10. In operation, the feed air compressed to a suitable pressure typically from about 517 KPA (75 psia) to 1.14 MPa (165 psia) and thereafter cooled to a temperature of from about 15° to 40° C., is introduced into one of adsorptive beds A and B by the opening of one of the valves 1 and 2, respectively.

The adsorptive beds A and B generally contain an adsorbent, activated alumina or silica gel, to remove water vapor, and a second adsorbent, typically a zeolite such as 13× zeolite, to remove carbon dioxide. These adsorbents may be in separate compartments or even in separate vessels. It is preferred, however, to have both in a single vessel with a layer of a suitable porous material between them to prevent co-mingling.

Utilizing Bed A to illustrate the cycle of the subject invention, Bed A is initially backfilled from Bed B. In order to backfill Bed A while Bed B is in the final stage of production, valve 3 is opened with valves 2 and 4 already open and the other valves remaining closed. At the conclusion of backfill. valves 2 and 4 are closed and valve 1 opened to admit air under pressure to Bed A at the beginning of the production step therefrom. Valve 3 remains open and air substantially free of water vapor and carbon dioxide flows out of the system through the line marked "To ASU". The product stream, which contains less than 0.1 ppm of water vapor and 1.0 ppm of carbon dioxide, is introduced into a cryogenic air separation unit (ASU), not shown. Towards the end of production, valve 4 is opened to backfill Bed B with product from Bed A.

At the completion of the production step of the cycle, valves 1 and 3 are closed and valves 7 and 9 opened to allow Bed A to vent to the atmosphere. The length of the production cycle is a time such that a front of impurities does not flow out of the adsorptive beds, i.e. they have not reached their adsorptive capacity. This is readily determined by conventional procedures well known to those of ordinary skill in the art. The determination and adjustment of the production step automatically with reference to the water vapor and carbon dioxide content of the incoming air feed using conventional sensing and regulating apparatus is likewise well known to those of ordinary skill in the art.

The venting of Bed A will continue for a predetermined time, typically until the pressure is reduced to just above atmospheric and the flow from the bed slackens. At this point, which also can be readily determined utilizing means well known to those skilled in the art, valve 9 is closed, valve 10 opened and the vacuum pump activated to evacuate Bed A. The evacuation of Bed A acts to desorb impurities which were not removed in the initial venting.

Evacuation of Bed A is continued until the pressure therein is reduced to a suitable level, generally mild vacuum conditions, such as 13.8 KPA (2 psia) to 41.4 KPa (6 psia), preferably 20.7 KPa (3 psia) to 34.5 KPa (5 psia). At this point, valve 5 is opened and purge gas is permitted to sweep the adsorbent in Bed A under vacuum thereby effectively removing desorbed impurities and carrying them from the bed. The purge gas is any gas which is at or below the levels of water vapor and carbon dioxide of the product gas of the PSA system. This can be a high nitrogen content waste gas of the ASU or nitrogen product gas therefrom. The evacuation of Bed A is maintained during the flow of purge gas into Bed A. The introduction of purge gas into Bed A flushes the bed thereby removing desorbed impurities. The statements made above concerning the monitoring and determining of the production step apply equally to the purge step.

At the conclusion of the purge step, valves 5, 7 and 10 are closed and valve 3 opened to backfill bed A with product gas being produced in Bed B. During the backfill step, valve 4 remains open and product gas from Bed B continues to be withdrawn from the system. The process can operate continuously in this manner.

Upon the completion of the backfill step, valves 2 and 4 are closed and valves 1, 3, 8 and 9 opened to begin another cycle. In the previous discussion, the process steps have been described with reference to Bed A only. Bed B is operating out of phase with Bed A so that one is undergoing the steps of venting, purging and backfill, while the other is producing product. A typical cycle for the subject process, as shown in FIG. 1, utilizing a two-bed system is shown in the following table.

FIG. 1 PSA Cycle

| Bed A | Valves Open | Bed B | Time (Sec). |
|---|---|---|---|
| Backfill from Bed B | 2, 3, 4 | Produce, backfill | 6.0 |
| Produce | 1, 3, 8, 9 | Bed A | |
| Produce | 1, 3, 8, 10 | Vent to Atmosphere | 19.0 |
| Produce | 1, 3, 6, 8, 10 | Vent under Vacuum | 10.0 |
| Produce, backfill | 1, 3, 4 | | |
| Bed B | | Purge under Vacuum | 145.0 |
| Vent to Atmosphere | 2, 4, 7, 9 | | |
| Vent under Vacuum | 2, 4, 7, 10 | Backfill from Bed A | 6.0 |
| | | Produce | 19.0 |
| Purge under Vacuum | 2, 4, 5, 7, 10 | Produce | 10.0 |
| | | Produce | 145.0 |
| | | | 6 Minute Cycle |

Figure 2:
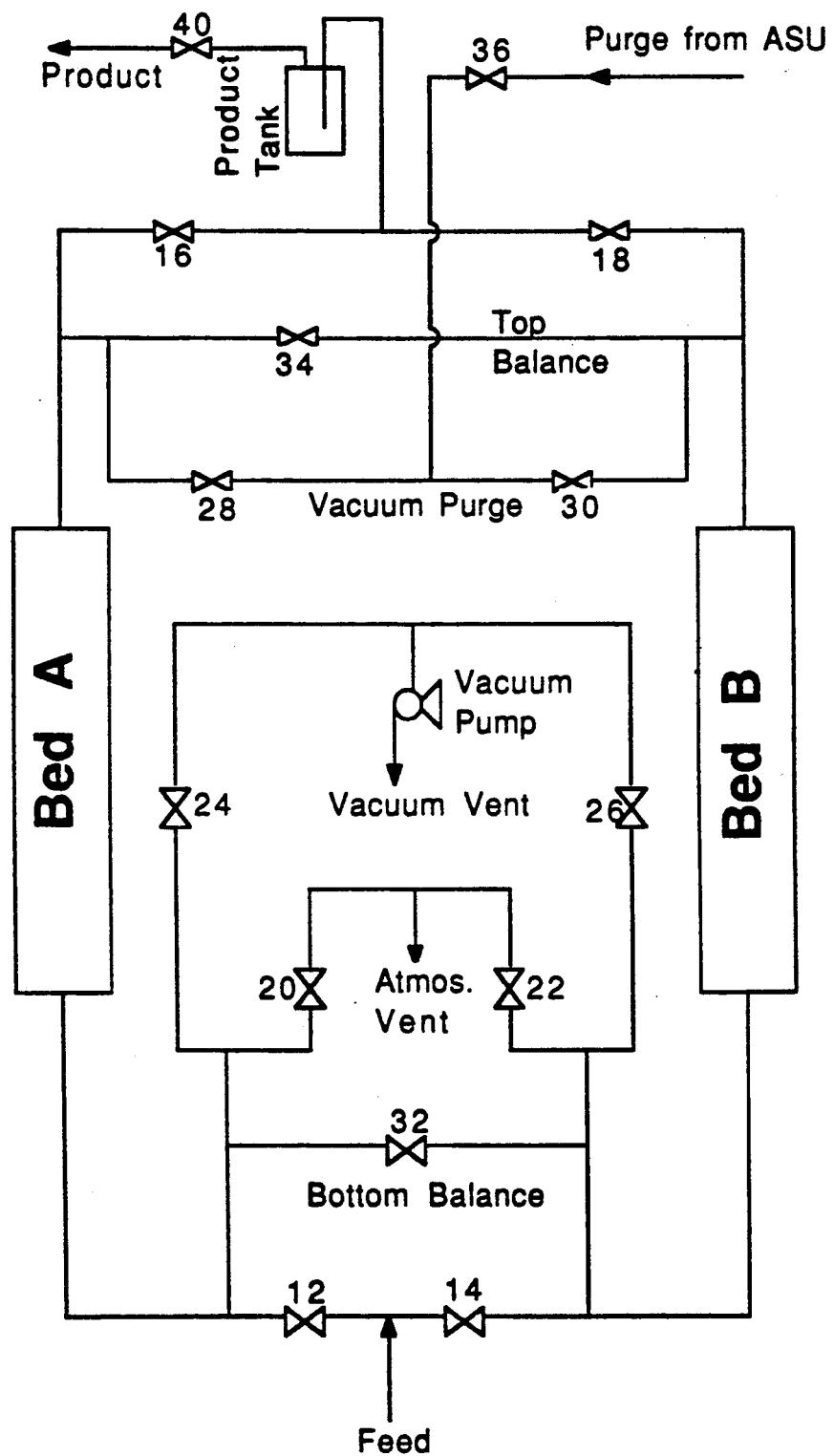
FIG. 2 is a schematic flow diagram of another embodiment of a PSA pre-purification system according to the invention.

The improved PSA for the pre-purification of air illustrated in FIG. 2 is similar to that shown in FIG. 1, but differs in that it provides for top and bottom equalization of the beds at the conclusion of production/regeneration and purging of the bed undergoing regeneration with product nitrogen from the ASU.

In FIG. 2, air is introduced under pressure into adsorptive Bed A or B through the opening of valves 12 or 14, respectively. Beds A and B contain an adsorbent as discussed with regard to FIG. 1. When Bed A is in the production step of the cycle, valves 12 and 16 are open and product is being admitted to the product tank which is kept under a constant pressure so that product gas can be withdrawn at the optimum pressure for the ASU by opening valve 40. The product is as defined in FIG. 1.

At the completion of the product step of the cycle, valves 12 and 16 are closed and valve 20 opened to allow Bed A to vent to the atmosphere. The length of the production step is as defined with reference to FIG. 1. When the venting of Bed A has reduced the pressure therein to just above atmospheric, valve 20 is closed, valve 24 opened and the vacuum pump activated. The evacuation of Bed A desorbs impurities which were not removed in the initial venting.

Evacuation of Bed A is continued until the pressure therein is reduced to a suitable level, generally mild vacuum conditions, such as 13.8 KPA (2 psia) to 41.4 KPa (6 psia), preferably 20.7 KPa (3 psia) to 34.5 KPa (5 psia). At this point, valves 28 and 36 are opened and purge gas, preferably product nitrogen from the ASU, is admitted to Bed A to flush the remaining impurities therefrom. As in FIG. 1, the vacuum pump continues to operate during the purge step.

At the conclusion of the purge step, valves 24, 28 and 36 are closed. Since this is also the end of the production step for Bed B, valves 14 and 18, open for production, will be closed as well. Thereafter, valves 32 and 34 are opened momentarily, thus allowing the pressure in Beds A and B to equalize from both the top and bottom. This begins the repressurizing of the bed, Bed A, which has just completed vacuum purge.

Valves 32 and 34 are closed and valve 16 is opened to backfill Bed A with gas from the product tank. Backfill is conveniently carried out at a pressure of from about 510 KPa (74 psia) to 1.13 MPa (164 psia). During the steps of backfill and pressure equalization, gas is being sent from the product tank to the ASU for separating into desired products.

Upon completion of the backfill step, valves 12, 16 and 22 are opened to begin another cycle. As in FIG. 1, Bed B is operating out of phase with Bed A so that one is producing product while the other is undergoing regeneration. A typical cycle for the subject process utilizing a two-bed system is shown in the following table.

FIG. 2 PSA Cycle

| Bed A | Valves Open | Bed B | Time (Sec). |
|---|---|---|---|
| Backfill with Product Gas | 16, 22 | Vent to Atmosphere | 6 |
| Produce | 12, 16, 22 | Vent to Atmosphere | 15 |
| Produce | 12, 16, 26 | Vent under Vacuum | 10 |
| Produce | 12, 16, 26, 30, 36 | Purge under Vacuum | 145 |
| Top-Bottom Equilization | 32, 34 | Top-Bottom Equalization | 4 |
| Vent to Atmosphere | 18, 20 | Backfill with Product Gas | 6 |
| Vent to Atmosphere | 14, 16, 20 | Produce | 15 |
| Vent under Vacuum | 14, 16, 24 | Produce | 10 |
| Purge under Vacuum | 14, 16, 24, 28, 36 | Produce | 145 |
| Top-Bottom Equalization | 32, 34 | Top-Bottom Equalization | 4 |
| | | | Total 360 Seconds |

The advantage of the subject pre-purification process lies in its improved efficiency of bed regeneration. Also, the purge gas can be provided at a moderate vacuum 25.3–33.3 KPa (190–250 mm Hg) resulting in a power savings. The use of purge gas under vacuum is particularly advantageous for gas mixtures containing impurities in the vapor form, i.e. water, at the adsorption temperature. It can be shown theoretically that the minimum amount of the purge gas needed to remove vapor impurities is given as:

$$\frac{P_{min}}{F} = \frac{P_L - P_V}{P_H - P_V}$$

where
$P_{min}$ = Minimum purge flow rate,
F = feed flow rate,
$P_L$ = Purge gas pressure,
$P_H$ = Feed gas pressure,
$P_V$ = Vapor pressure of the impurity at the adsorption temperature.

As an example, purge as a fraction of feed ($P_{min}/F$) was calculated for 827 KPa (120 psia) adsorption pressure and 30° C. adsorption temperature for various purge gas pressures, PL. The feed stream was assumed to be water saturated at 50° C. The results are given in the following table.

| Effect of Purge Gas Pressure on Minimum Purge Flow | |
|---|---|
| $P_L$ KPa (psia) | $P_{min}/F \times 100$ (%) |
| 101 (14.7) | 11.8 |
| 82.7 (12.0) | 9.5 |
| 69 (10.0) | 7.9 |
| 55 (8.0) | 6.2 |
| 41.4 (6.0) | 4.5 |
| 27.6 (4.0) | 2.8 |
| 13.8 (2.0) | 1.2 |

The actual amount of purge gas needed varies between 1.1 to 2.0×$P_{min}$ (C. H. Skarstrom, in *Recent Develooments in Seoaration Science*. Vol. 2, pp 95–106, CRC Press, Cleveland, (1972). It is clear from the above table that, by providing the purge gas under vacuum ($P_L$ < 14.7 psia), the amount of purge gas required for $H_2O$ vapor removal can be reduced substantially.

The Japanese Kokai patent publication Sho 59-4414 (1984), discussed above, regenerates the carbon dioxide column under evacuation and the water vapor column by atmospheric purge. Because of this, the amount of purge gas could not be reduced to below 25%. In the process of the subject invention, both the water vapor and carbon dioxide adsorbents are regenerated by purge under vacuum and, therefore, the amount of purge gas needed can be reduced to below 9%, which is lower than the average conventional TSA pre-purification process and substantially lower than all previously known PSA pre-purification processes. The very high product recovery for the present process justifies the use of the vacuum pump in conjunction with the purge.

The use of 13 X zeolite adsorbent particles which are finely particulate, i.e. having an average size less than 2 mm, preferably from 0.6 to 1.6 mm, in the $CO_2$ removal zone coupled with the use of vacuum purge in the present process gives very high sieve specific product. The high sieve specific product obtained (40–60 SCFM/ft$^3$) with zeolite particles having a particularly preferred average size range of 0.4 to 0.8 mm is an indication of possible capital savings as well as the use of smaller adsorptive beds allows for smaller vessels, a lesser quantity of adsorptive material and the like. The sieve specific product obtained in the present process is about eight times that provided in the commercial PSA pre-purification process described by Tomomura et al., discussed above.

The following table gives the results of a series of experiments utilizing the system as illustrated in FIGS. 1 and 2. The bed equalization step was omitted in runs A and B, which pertain to FIG. 1, and included in runs C and D, which pertain to FIG. 2. The beds utilized contained 25% by volume of 3 mm size commercially available activated alumina and 75% by volume of 0.4–0.8 mm size commercially available 13 X zeolite. The adsorption was carried out at a temperature of 22°–23° C., at a pressure of 780 KPa (113 psia) and a total cycle time of 6.0 min. It will be appreciated from the data given in the table that the use of the bed equalization step is a preferred embodiment of the subject invention.

| SUMMARY OF AIR PRE-PURIFICATION RUNS | | | | |
|---|---|---|---|---|
| | Run A | Run B | Run C | Run D |
| Purge Gas Pressure KPa (mm Hg) | 25.9 (195) | 25.9 (195) | 25.9 (195) | 32.6 (245) |
| Product Water Vapor Concentration (ppm) | 0.1 | <0.1 | <0.1 | 0.1 |
| Product Carbon Dioxide Concentration (ppm) | 0.23 | 0.40 | 0.38 | 0.41 |
| Percent Feed Gas Used for Regeneration | 12.1 | 10.0 | 8.1 | 8.6 |
| Sieve Specific Product (Nm$^3$/min/m$^3$ sieve) | 32.3 | 40.5 | 42.4 | 58.9 |

The advantage of the subject process lies in the efficiency of adsorptive bed regeneration. Not only is the subject process more efficient than conventional PSA pre-purification processes, it is also advantageous in comparison to the average temperature swing adsorption process since it has a much higher sieve specific product and requires less regeneration gas (8%–10% compared to 12%–15% for a comparable TSA process.

The invention has been described with reference to preferred embodiments thereof. It will be appreciated by those skilled in the art that various modifications may be made from the specific details given without departing from the spirit and scope of the invention.

We claim:

1. A pressure swing absorption process for the removal from air of gaseous impurities consisting of water vapor and carbon dioxide comprising, in cyclic sequence:
    (a) introducing air under pressure into a first absorptive bed comprising an absorbent selective for the absorption of water vapor and 13 X zeolite having an average particle size of about 0.6 to 1.6 mm to thereby remove said impurities therefrom and form a product gas;
    (b) at the conclusion of the removal step, ceasing introduction of air and venting said bed to the atmosphere;
    (c) evacuating said bed by vacuum means while continuing to vent the withdrawn gas to the atmosphere;
    (d) introducing a purge gas into said bed while continuing the evacuation thereof by vacuum means; and
    (e) backfilling said bed with product gas from a second bed which is operating out of phase with the first bed so that one bed is producing product gas by step (a) while the other is being regenerated by steps (b), (c) and (d).

2. A process in accordance with claim 1, wherein said absorbent selective for the absorption of water vapor is activated alumina or silica gel.

3. A process in accordance with claim 2 wherein the zeolite has an average particle size of from about 0.4 to 0.8 mm.

4. A process in accordance with claim 1, wherein the purge gas is product gas formed in step (a).

5. A process in accordance with claim 1, wherein, prior to step (e), the tops and bottoms of said beds are placed in communication thereby equalizing the pressure therebetween.

6. A process in accordance with claim 1, wherein the product is introduced into a cryogenic air separation unit.

7. A process in accordance with claim 6, wherein the purge gas is a product gas from said unit.

8. A process in accordance with claim 6, wherein the purge gas is a nitrogen-enriched waste stream from said unit.

* * * * *

UNITED STATES PATENT AND TRADEMARK OFFICE
CERTIFICATE OF CORRECTION

PATENT NO. : 5,156,657
DATED : October 20, 1992
INVENTOR(S) : Jain et al.

It is certified that error appears in the above—identified patent and that said Letters Patent is hereby corrected as shown below:

Col. 5, lines 12 through 26, delete entire table and substitute therefor:

FIG.1 PSA Cycle

| Bed A | Valves Open | Bed B | Time (sec.) |
|---|---|---|---|
| Backfill from Bed B | 2, 3, 4 | Produce, backfill Bed A | 6.0 |
| Produce | 1, 3, 8, 9 | Vent to Atmosphere | 19.0 |
| Produce | 1, 3, 8, 10 | Vent under Vacuum | 10.0 |
| Produce | 1, 3, 6, 8, 10 | Purge under Vacuum | 145.0 |
| Produce, backfill Bed B | 1, 3, 4 | Backfill from Bed A | 6.0 |
| Vent to Atmosphere | 2, 4, 7, 9 | Produce | 19.0 |
| Vent under Vacuum | 2, 4, 7, 10 | Produce | 10.0 |
| Purge under Vacuum | 2, 4, 5, 7, 10 | Produce | 145.0 |

6 Minute Cycle

UNITED STATES PATENT AND TRADEMARK OFFICE
CERTIFICATE OF CORRECTION

PATENT NO. : 5,156,657
DATED : October 20, 1992
INVENTOR(S) : Jain et al.

It is certified that error appears in the above—identified patent and that said Letters Patent is hereby corrected as shown below:

Col. 8, line 26, delete "absorption" and substitute therefor --adsorption--.
    lines 30/31, delete "absorptive" and substitute therefor --adsorptive--.
    line 31, delete "absorbent" and substitute therefor --adsorbent--.
    line 32, delete "absorption" and substitute therefor --adsorption--.
    line 50, delete "absorbent" and substitute therefor --adsorbent--.
        delete "absorption" and substitute therefor --adsorption--.

Signed and Sealed this

Twenty-third Day of November, 1993

Attest:

BRUCE LEHMAN

*Attesting Officer*    *Commissioner of Patents and Trademarks*